Nov. 26, 1935.　　　　　F. M. REID　　　　　2,022,387
TRACTOR SEMITRAILER POWER TRANSMITTING MEANS
Filed Dec. 22, 1933　　　3 Sheets-Sheet 1
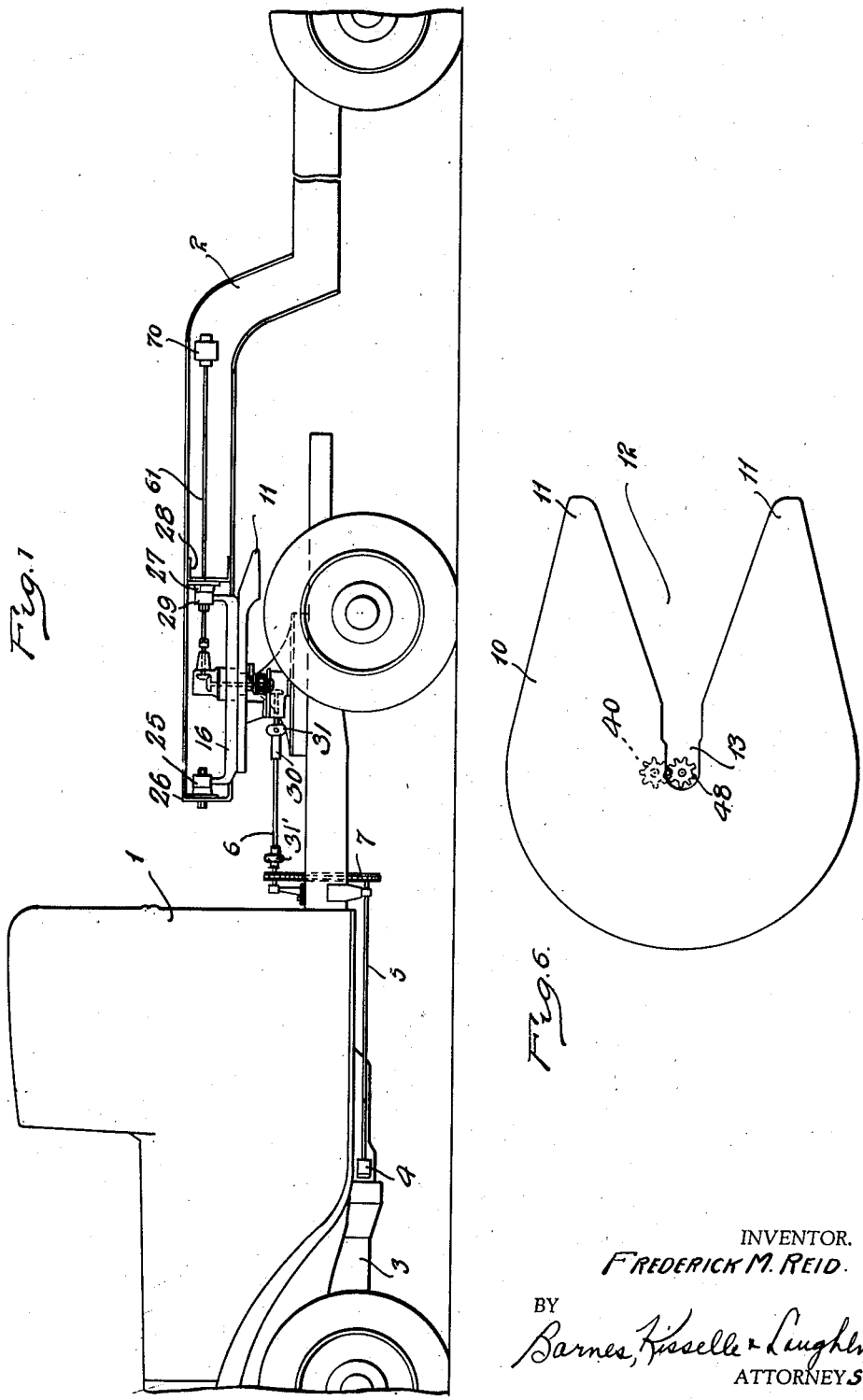
INVENTOR.
FREDERICK M. REID.
BY
ATTORNEYS.

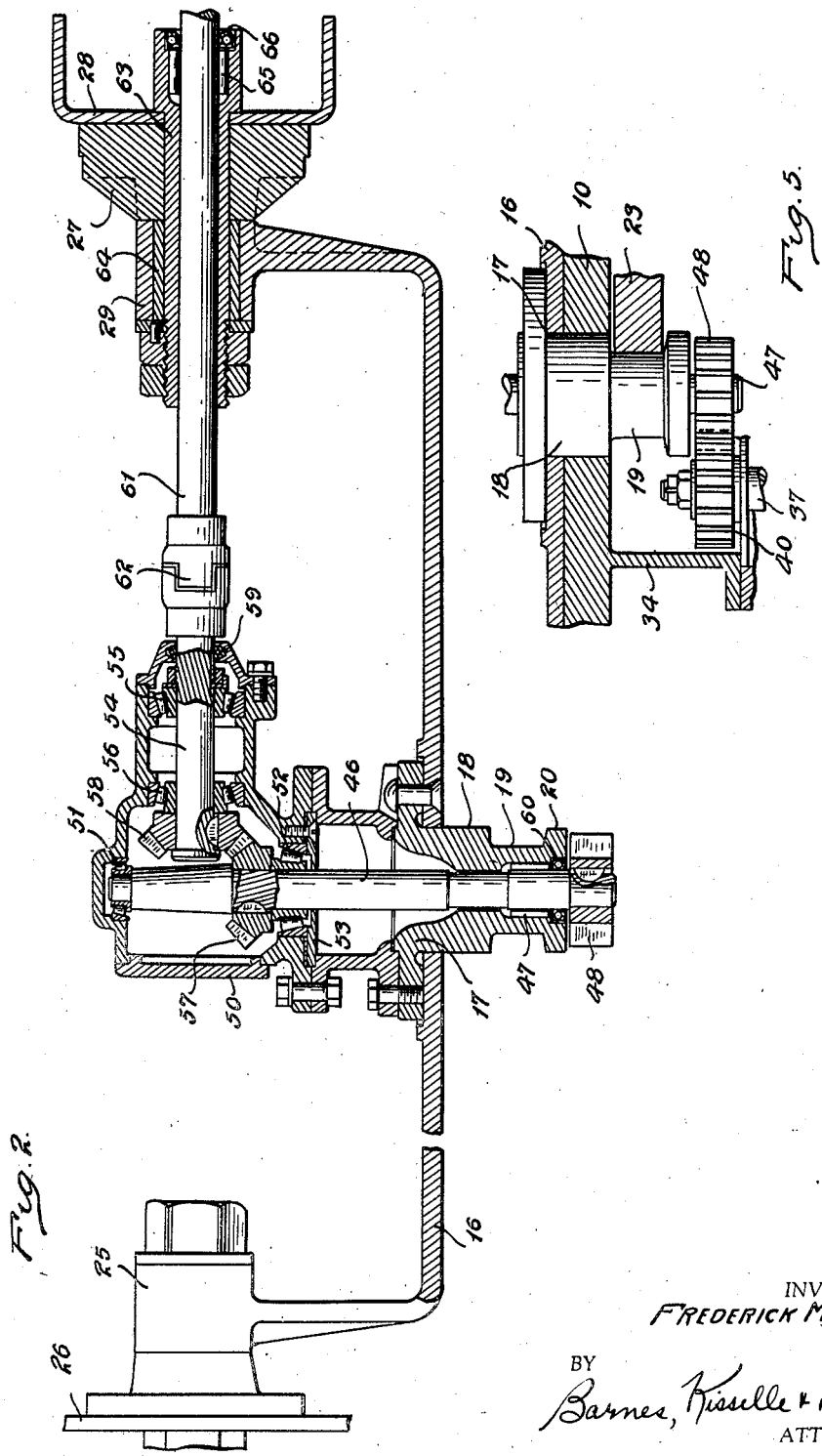

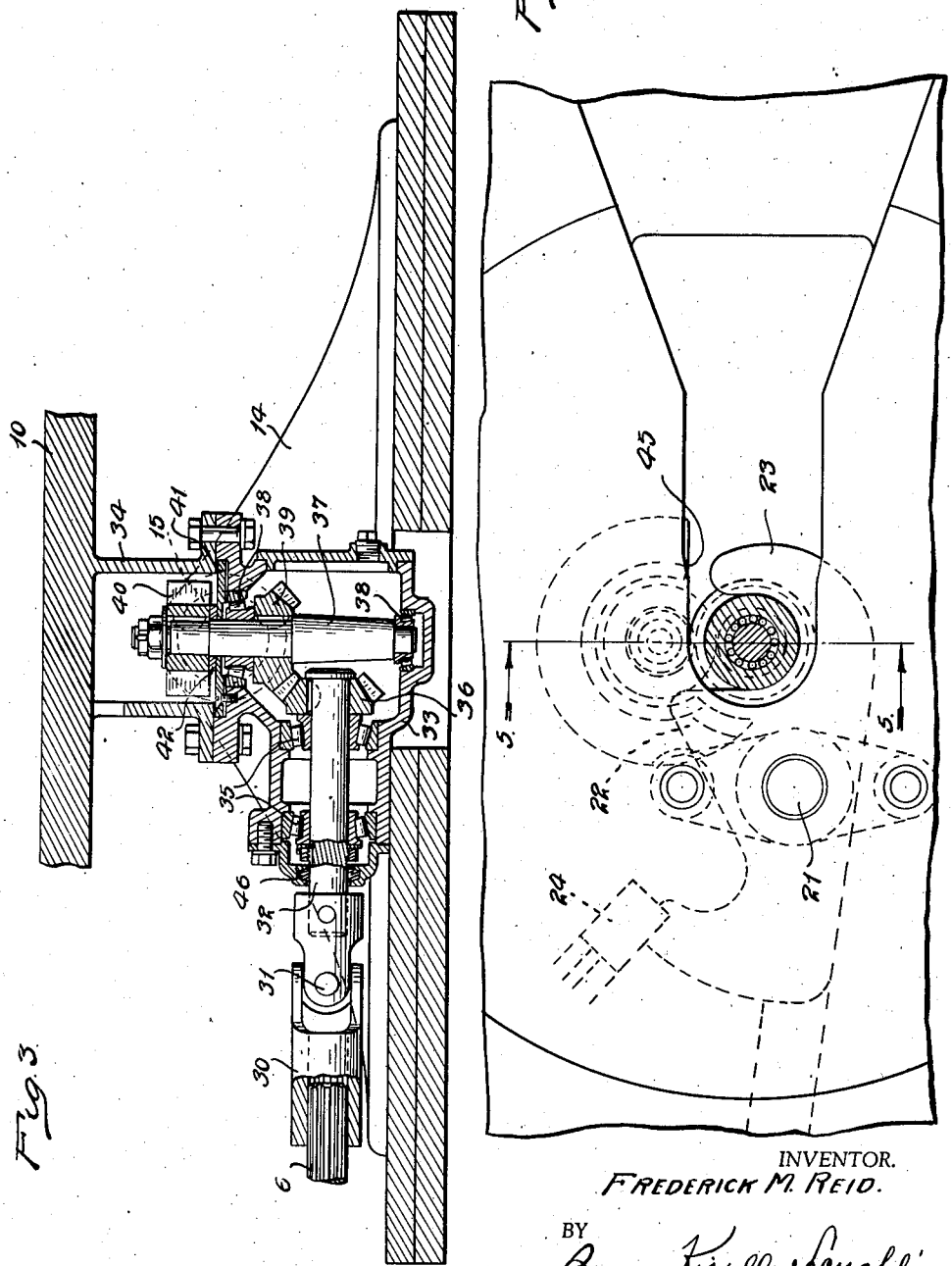

Patented Nov. 26, 1935

2,022,387

UNITED STATES PATENT OFFICE 2,022,387

TRACTOR SEMITRAILER POWER TRANSMITTING MEANS

Frederick M. Reid, Detroit, Mich., assignor to Fruehauf Trailer Corporation, Detroit, Mich., a corporation of Michigan Application December 22, 1933, Serial No. 703,583

10 Claims. (Cl. 180—14)

This invention relates to tractor semi-trailer combinations, and it has to do particularly with such combinations wherein the tractor and trailer are readily separated, and the tractor readily attachable to any one of a number of trailers. The invention is directed to the provision of means for transmitting power from the tractor to the trailer for operating any device on the trailer, with the power transmitted through the separable coupling between the tractor and the trailer. One of the principal objects of the invention is to provide such a power transmitting means which includes cooperating elements on the tractor and trailer so arranged that they may be brought into and out of operative association upon the coupling of the tractor to the trailer and the separation of the tractor and trailer. Other objects will become apparent as the disclosure is unfolded by the following description taken in conjunction with the accompanying drawings.

Fig. 1 is a general view showing a tractor and semi-trailer in coupled relation illustrating some of the power transmitting means of the present invention.

Fig. 2 is a detailed view largely in cross section showing the structure on the trailer.

Fig. 3 is a view largely in section illustrating the structure on the tractor.

Fig. 4 is a plan view illustrating a portion of the lower fifth wheel on the tractor and the coupling for establishing the connection with the trailer, showing the trailer coupling part in cross section.

Fig. 5 is a detailed sectional view taken substantially on line 5—5 of Fig. 4.

Fig. 6 is a plan view showing the lower fifth wheel member and illustrating the cooperating power transmitting elements.

A tractor is generally illustrated at 1 and a trailer generally illustrated at 2. The tractor may have the usual engine 3 arranged with a power takeoff 4 which may be under the control of an operator, and the mechanism may include a shaft 5, and a shaft 6 each of which may have a sprocket over which runs an interconnecting chain 7. No claim is made to this specific type of power takeoff on the tractor and the particular structure is for illustrative purposes only, it being within the invention to employ any suitable type of power takeoff.

The invention may be incorporated in a tractor semi-trailer combination wherein the tractor has a rocking fifth wheel arranged to tilt normally rearwardly and wherein the trailer is provided with an upper fifth wheel member arranged to ride up on the inclined lower fifth wheel member on the trailer to establish a coupling and thus, in some instances, elevate the trailer during such coupling. A king pin may be employed and this may be upon either the tractor or the trailer. The lower fifth wheel on the tractor is illustrated at 10 and it may have rearwardly extending wings 11 defining a guideway 12 which terminates into a fairly accurately sized notch or socket 13. This lower fifth wheel may be pivotally mounted to brackets 14 on a transverse axis as at 15 as indicated in Fig. 3. The upper fifth wheel member on the trailer is shown at 16 and it is provided with a king pin 17 provided with a fairly accurately sized part 18 for fitting in the notch 13 as illustrated in Fig. 5. The king pin may have a reduced portion 19 and a head 20. A latch is employed for locking the king pin in the notch and this latch may take the form of the latch shown in the Hartwick Patent No. 1,351,245 of August 31, 1920. The latch, as illustrated in Fig. 4, may be pivoted at 21 to the lower fifth wheel member and it may have a projection 22 and a locking finger 23. As the king pin moves into the notch it strikes the projection, rocks the latch counterclockwise as Fig. 4 is viewed to bring the locking finger around the king pin and the latch may be held by a spring pressed bolt 24. This particular form of locking device may be like that shown in my Patent No. 1,925,279 of September 5, 1933. The finger 23 engages in the reduced part 19 as illustrated in Fig. 5. This arrangement fairly accurately centers the king pin and the same is held from substantial lateral movement with respect to the lower fifth wheel member by the walls of the notch 13.

In the particular form of upper fifth wheel member shown herein, the same is pivoted on a longitudinal axis. As shown in Fig. 3, it may have a forward pivotal mounting 25 carried by the front portion of the frame as at 26, and the rear mounting may be in the form of a bracket 27 fastened to a frame cross member 28 by welding or the like, for supporting a journal mounting for the portion 29 of the upper fifth wheel plate. Where the semi-trailer is equipped with an oil tank or the like, such a fifth wheel member may be used, and as the combined vehicle operates over an irregular roadway the upper fifth wheel member may rock relative to the trailer frame to thus save the trailer frame and tank from twisting strains which may injure the tank. However, the invention is applicable to a structure wherein the upper fifth wheel member is fastened rigidly to the trailer frame.

It may further be said that the forward portion of the trailer frame may be equipped with supporting legs so that the frame is supported in an elevated position when disconnected from the tractor. Such a supporting leg structure may be like that shown in my Patent No. 1,898,- 854 of February 21, 1933. Such legs are not shown herein.

Some of the power transmitting means are mounted upon the lower fifth wheel member and this is shown in Fig. 3. The shaft 6 may have a slip connection with a fitting 30 in turn connected by a universal joint 31 with a stub shaft 32. A universal joint 31' is also provided in the forward portion of the shaft 6 to permit the required flexibility of the shaft 6 as will hereinafter be understood. A suitable housing 33 may be fastened to a cooperating housing portion 34 on the underside of the lower fifth wheel. The stub shaft 33 is journaled in the housing as by means of anti-friction bearings 35 and a pinion 36 which may be in the form of a miter gear is keyed to the stub shaft 32. Another stub shaft 37 may be journaled in the housing by means of anti-friction bearings 38 and another pinion 39 in the form of a miter gear is keyed thereto and the teeth of the two pinions mesh. A gear 40 is keyed to the upper end of the stub shaft 37. A hold-down plate 41 may take the thrust from the bearing 38 during operation of the device and the gear 40 may normally rest upon a plate bearing 42. It will be readily appreciated how the turning of the shaft 6 transmits rotary motion to the gear 40. The lower fifth wheel is permitted to rock upon its axis by the combination of the universal joints 31 and 31' and the slip joint 30. It will be observed by consideration of Figs. 4, 5 and 6, that the stub shaft 37 and gear 40 are eccentrically positioned with respect to the notch for the king pin. The housing portion 34 is cut away on one side as illustrated at 45 so that the teeth of the gear 40 next adjacent the notch 13 project from the housing and partially into the notch 13. The housing 33 may be arranged to contain a lubricant and a suitable seal 46 may be arranged around the stub shaft 32.

The power transmitting mechanism on the trailer is illustrated in Fig. 2. The king pin may be hollow and a shaft 46 may be journaled therein by anti-friction rollers 47. The end of the shaft may extend out beyond the lower end of the king pin and keyed to its projecting end is a gear 48 for cooperation with the gear 40. A housing 50 may be carried by the upper fifth wheel plate and the shaft 46 may be journaled in bearings 51 and 52, and a thrust plate 53 may be associated with the bearing 52. Another stub shaft 54 may be journaled in an extension of the housing by means of anti-friction bearings 55 and 56 and a pinion 57 keyed to the shaft 46 may mesh with the pinion 58 keyed to stub shaft 54. The housing may contain a lubricant and may be equipped with lubricant seals 59 and 60. A shaft 61 may be coupled to the stub shaft 54 as at 62 and this shaft may extend through the axial center of the pivotal mounting of the upper fifth wheel plate. To this end a sleeve 63 may extend through the bracket 27 and a part of the frame and it is upon this sleeve that the upper fifth wheel may be rockably mounted as by means of a bearing 64. The shaft may turn in a suitable anti-friction bearing, such as a roller bearing 65 and this bearing, may run in a lubricant retained by a seal 66. The shaft 61 may extend rearwardly into the trailer frame to any desired location where it may be attached to any mechanism designed to be operated. As shown herein such a device is illustrated at 70 and, for example, this may be a pump for use on semi-trailers having a tank for carrying gasoline, fuel oil, or other liquid, the pump being used to pump the liquid into or out of the tank. It is to be appreciated, however, as expressed above, that shaft 61 may be associated with any device to be operated for performing any sort of a service operation. For example, the semi-trailer may be equipped with a dump body and the body may be elevated into dumping position by the power means. The power may be used for other purposes but it is not necessary herein to recite all the purposes as it is believed to be sufficient to say that power may be used for operating a device to perform a service operation.

When the combined vehicle is operating, the lower fifth wheel is free to pivot upon its transverse axis, and by reason of the shaft 61 extending through the rocking axis of the upper fifth wheel member, this member is free to rock on its longitudinal axis. The gears 40 and 48 advantageously are of a type which may be termed "spur gears" having so-called stub teeth preferably formed quite sharp at their ends so that the teeth readily mesh with each other and are not subject to that action where the teeth may meet head on and jam instead of meshing. Such teeth are shown in Fig. 6. In coupling, the king pin is guided by the slot 12 into the notch 13 where it is accurately positioned so that the gear centers are properly located as the enlarged part 18 of the king pin reaches the bottom of the notch and is held from lateral movement by the sides thereof. The spur teeth of the gears insure their meshing during this action and a slight rotation of one or the other may result as the tractor and trailer are coupled and uncoupled. The latch, in catching into the reduced portion 19 of the king pin behind the head on the king pin holds the fifth wheel members from any substantial vertical separation and thus the gears are held in operative relation. It is to be understood that the arrangement may be reversed, with the king pin on the tractor and the socket therefor on the trailer.

I claim:

1. The combination with a tractor and a semi-trailer having power operated means, a king pin for one and a socket for the king pin for the other, releasable latch means for holding the king pin in the socket, the tractor and trailer being connectible and separable and the king pin adapted to move into and out of its socket by relative fore and aft movement of the tractor and trailer, of power transmitting means for the tractor and power transmitting means for the trailer, one of the power transmitting means having a shaft disposed on the axial center of the king pin and a gear concentric with the king pin, the other power transmitting means having a gear disposed eccentrically of the king pin socket and positioned so that the teeth of the gear concentric with the king pin mesh with the teeth of the second mentioned gear when the king pin moves into its socket.

2. The combination with a tractor unit and a trailer unit, a slotted fifth wheel member for one unit having a socket into which the slot connects, a cooperating fifth wheel member for the other unit having a king pin movable into and out of the socket through the slot, and a releasable latch for holding the king pin in the slot, of power transmitting means on one of said tractor units including a gear positioned on an axis eccentric with said socket and with the teeth of the gear projecting into the socket, and power transmitting means on the other of said units including a gear concentric with the king pin, the teeth on said gears being arranged to come into and out of meshing relation as the units connect and separate, respectively.

3. The combination with a tractor unit and a trailer unit, a slotted fifth wheel member for one unit having a king pin socket, a fifth wheel member for the other unit, a hollow king pin thereon arranged to move into and out of the socket through the slot as the tractor and semi-trailer connect and separate, and releasable means for holding the king pin in its socket, of power transmitting means carried by the fifth wheel member of one of said units and including a gear positioned eccentrically of the socket with its teeth projecting thereinto, and power transmitting means on the second unit including a shaft journaled in the hollow king pin and a gear fastened to the shaft and located adjacent the end of the king pin, the teeth of said two gears being arranged to come into and out of mesh as the units connect and separate.

4. In a semi-trailer, an upper fifth wheel member therefor, means pivoting the fifth wheel member on an axis extending longitudinally of the trailer, a king pin on the fifth wheel member, a shaft journaled in the king pin, another shaft extending longitudinally of the trailer and through one of the pivoting means for the fifth wheel member and on the axis thereof, and means including gears connecting the two shafts in driving relation.

5. The combination with a tractor having power transmitting means and a semi-trailer having power operating means, a king pin on one and a socket for the king pin on the other, and releasable latch means for holding the king pin in the socket, the tractor and trailer being connectible and separable and the king pin adapted to move into and out of its socket by relative fore and aft movement of the tractor and semi-trailer, of a shaft disposed on the axial center of the king pin, a spur gear concentric with the king pin, and a spur gear disposed eccentrically of the king pin socket and positioned so that the teeth of the gear concentric with the king pin mesh with the teeth of the eccentrically disposed gear when the king pin moves into its socket.

6. The combination with a tractor unit having power transmitting means and a semi-trailer unit having means adapted to be operated by power, a slotted fifth wheel member having a king pin socket adapted to be mounted on one unit, and a cooperating fifth wheel adapted to be mounted on the other unit having a king pin for fitting into the socket of the first unit and the king pin being adapted to move through the slot into and out of the socket as the tractor and semi-trailer connect and separate, respectively, by fore and aft movement, of power transmitting means carried by the fifth wheel member for the trailer and connected for driving relation with said power operated means, said power transmitting means each including an element arranged automatically to come into and out of cooperative relation as the king pin enters and leaves the socket, respectively, means for pivotally mounting the fifth wheel member on the trailer on a longitudinal axis, the power transmitting means carried by said pivoted fifth wheel member having a shaft positioned upon said axis, and releasable coupling means for holding the king pin in the socket.

7. The combination with a tractor and a semi-trailer, a part adapted to be carried by said tractor and a part adapted to be carried by said trailer, a king pin on one of said parts and a socket on the other of said parts, said king pin and said socket adapted to be engaged and disengaged by substantially relative horizontal movement between said parts, of a drive shaft adapted to be driven from said tractor, a driven shaft adapted to drive a device on said trailer, means for drivingly connecting said shafts together upon engagement of said king pin and socket including a rotatable member carried by one of said parts and a rotatable member carried by the other of said parts, said members being automatically brought into cooperative driving engagement with each other by relative horizontal movement between them with their corresponding parts.

8. The combination with a tractor and a semi-trailer, a part adapted to be carried by said tractor, a part adapted to be carried by said trailer, a king pin on one of said parts and a socket on the other of said parts, said king pin and socket adapted to be engaged and disengaged by substantially relative horizontal movement between said parts, of a drive shaft adapted to be driven from said tractor, a driven shaft adapted to drive a device on said trailer, and means carried by each of said parts connected with their cooperating shafts automatically adapted for operative driving engagement and disengagement with each other solely upon said relative horizontal movement between said parts.

9. The combination with a tractor having a source of power and a trailer having a part to be driven, a pair of fifth wheel parts, one adapted to be mounted on said tractor and the other adapted to be mounted on said trailer, said parts arranged to come into and out of co-operating juxtaposed relation upon relative bodily movement between them in a substantially horizontal direction, of gears associated with each of said parts, one adapted to be drivingly connected with said source of power and the other adapted to be connected with said part to be driven, and means associated with each of said gears automatically operable upon movement of said parts in said horizontal direction to mesh and unmesh, respectively, said gears, as said parts move into and out of operative relation with respect to each other.

10. In combination with a tractor having a source of power and a trailer having a part to be driven, a pair of fifth wheel parts, one adapted to be mounted on said tractor and one adapted to be mounted on said trailer, said parts arranged to come into and out of cooperating juxtaposed relation upon relative bodily movement between them in a substantially horizontal direction, of rotatable means associated with each of said parts, one adapted to be drivingly connected with said source of power and one adapted to be connected with said part to be driven, and gears connected with each of said means automatically operable upon movement of said parts to mesh and unmesh, respectively, as said parts are moved into and out of operative relation with respect to each other.

FREDERICK M. REID.